Sept. 11, 1956     K. C. JENNE     2,762,595
INTERLOCKED BRACKET AND FASTENER
Filed June 5, 1951
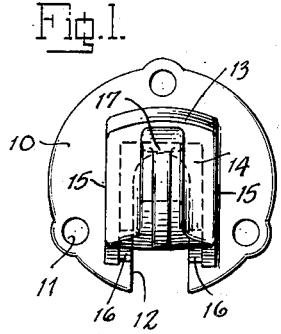
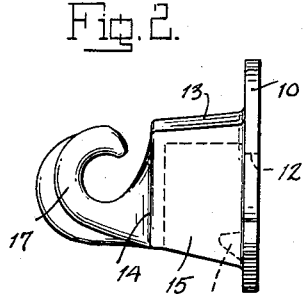
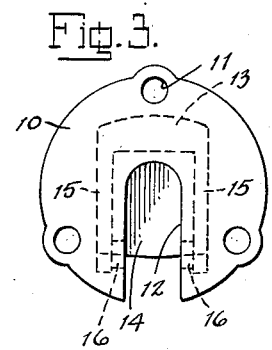
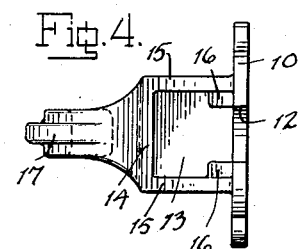
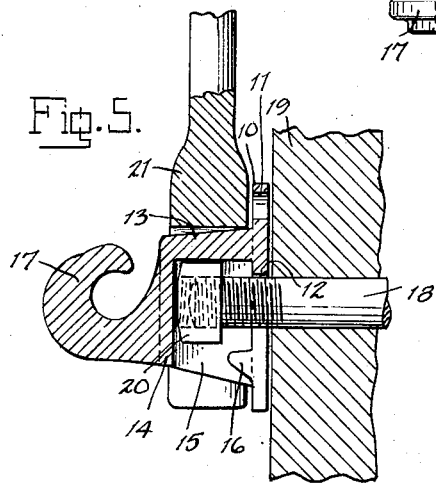
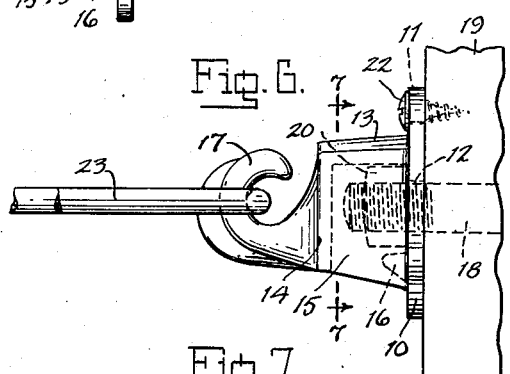
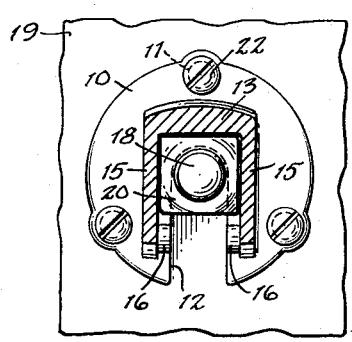
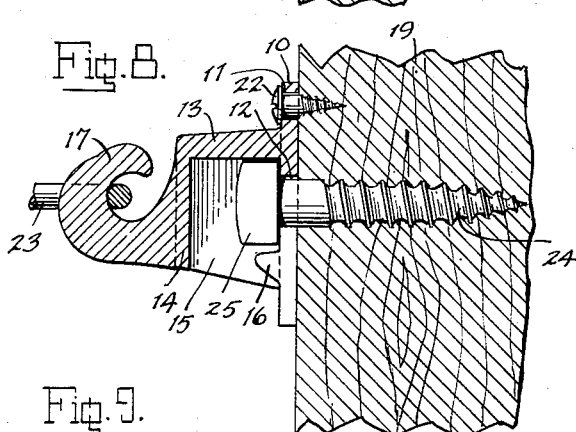
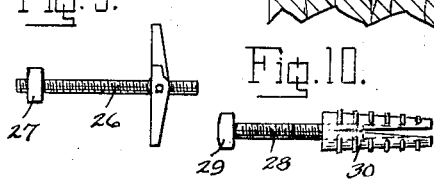
Inventor
KENNETH C. JENNE
By
Attorney

United States Patent Office 2,762,595
Patented Sept. 11, 1956

2,762,595

INTERLOCKED BRACKET AND FASTENER

Kenneth C. Jenne, Branford, Conn., assignor to Malleable Iron Fittings Company, Branford, Conn., a corporation of Connecticut Application June 5, 1951, Serial No. 230,037

1 Claim. (Cl. 248—224)

The present invention relates to a universal house bracket for electric cable connection, and particularly a device of this character for connecting power or telephone lines extending from a pole to the side of a house. Heretofore devices of this character have usually consisted of a hook or the like having a base flange and provided with a fastening screw permanently cast therein. It is proposed in the present invention to provide a hook or the like, separately formed from the screw or other fastening means, and which is adapted for interlocking engagement with a nut, head, or similar part of the fastening means. As a result of this arrangement the present bracket is adapted for universal use through cooperation with various types of fasteners, such as bolts having either a head or nut end, lag screws, toggle fasteners, expansion shield fasteners, and the like, and which various types of fasteners are individually adapted for fastening to certain types of material, as for instance wood, metal, brick, concrete, etc. A further object is to provide a bracket which will constitute a protective cover for the exposed end of the fastener to resist deterioration due to weather exposure. It is further proposed to provide a bracket adapted to accommodate a wrench or the like to facilitate tightening.

With the above and other objects in view an embodiment of the invention is shown in the accompanying drawings and this embodiment will be hereinafter more fully described with reference thereto and the invention will be finally pointed out in the claim.

In the drawings:

Fig. 1 is a front elevation of the house bracket, according to the illustrated exemplary embodiment of the invention.

Fig. 2 is a side elevation.

Fig. 3 is a rear elevation.

Fig. 4 is a bottom plan view.

Fig. 5 is a vertical sectional view, showing the bracket engaged with a bolt provided with a fastening nut, and showing a wrench in cooperative engagement with the bracket for the purpose of tightening.

Fig. 6 is a side elevation showing the bracket in its interlocked tightened relation with the bolt and nut and showing a cable connector loop engaged therewith.

Fig 7 is a vertical sectional view, taken along the line 7—7 of Fig. 6.

Fig. 8 is a vertical sectional view showing the bracket in connected relation with a lag screw.

Fig. 9 shows, on a reduced scale, a toggle bolt adapted for cooperation with the bracket.

Fig. 10 shows, on a reduced scale, an expansion shield type fastener for cooperation with the bracket.

Similar reference characters indicate corresponding parts throughout the several figures of the drawings.

Referring to the drawings the house bracket, according to the illustrated exemplary embodiment of the invention, comprises a base 10, preferably of substantially circular form, provided at suitably spaced peripherally extended points with holes 11 for receiving screws to position the bracket against turning, as will presently more fully appear, the base being provided with a vertically disposed slot 12 extending inwardly from the periphery and having its upper rounded end centrally disposed for receiving the bolt shank or similar part of the fastening device, as will presently more fully appear.

Upon the face of the base 10 there is integrally formed a box-like body portion having an upper wall 13, a front wall 14 and side walls 15—15, the inner side of the top wall being horizontally disposed and upwardly spaced from the upper end of the slot 12, the inner side of the front wall 14 being vertically disposed and in forwardly spaced parallel relation to the base plate, and the inner sides of the side walls being vertically disposed in a continuous plane at right angles to the base plate and in outwardly spaced parallel relation to the side walls of the slot 12. There is thus provided a substantially rectangular pocket, open at its lower side, for receiving in non-turning relation a square nut, bolt head, or similar part of a fastening device, the distance between the front wall 14 and the base plate 10 being calculated as substantially greater than the thickness of the nut bolt head or the like, for a purpose presently to be more fully pointed out.

A pair of retaining lugs 16—16 are respectively provided at each side of the slot 12, being each formed upon an inner side of one of the side walls 15 and the forward side of the base plate, their upper abutment surfaces being in downwardly spaced relation to the inner side of the top wall 13 a distance slightly greater than the width of the nut, bolt head, or the like, and their forward ends being spaced from the inner side of the front 14 a distance slightly greater than the thickness of the nut, bolt head or the like. Thus when the nut, bolt head, or the like is positioned adjacent the inner side of the front wall 14, as shown in Fig. 5, the bracket may be readily engaged or disengaged therewith through the open end of the pocket, and when the nut, bolt head, or the like is engaged against the forward side of the base plate, as shown in Fig. 6, the lugs prevent relative engaging or disengaging movement of the bracket.

Upon the forward side of the body there is integrally formed a hook 17. Obviously, instead of the hook, an eye, stud or other suitable connecting structure may be employed.

As shown in Figs. 5 to 7 the device is connected to a fastener in the form of a bolt 18 secured in the house wall 19, which may be wood, concrete, metal or other suitable material, the bolt having its threaded end projected for engagement by a square fastening nut 20 having opposite flat sides parallel to each other. In order to mount the bracket, the nut is first engaged with the threaded end of the bolt at a distance from the wall surface at least equal to the distance between the rearward side of the base plate and the forward ends of the lugs 16, so that the bracket may be slipped into engagement therewith by engaging the nut through the lower open end of the pocket forwardly of the lugs 16, as shown in Fig. 5. Thereupon the bracket is turned to screw the nut inwardly, forming in effect a wrench for this purpose. The parallel sides of the body provide a structure for engagement by an open end wrench 21, so that the bracket may be turned to tighten the nut against the forward surface of the base plate and to tightly clamp the base plate between the nut and the house wall 19, as shown in Fig. 6. In this position the retaining lugs 16 interlock the bracket with the fastening device. In order to retain the bracket against turning, positioning screws 22 are screwed into the house wall through the holes 11. The connecting loop 23 or other connecting means of the power line cable or the like is thereupon engaged over the hook 17.

In Fig. 8 I have shown the cooperative relation of the bracket with a lag screw 24 having a square head 25, the method of attaching being substantially similar to that shown in Figs. 5 to 7, that is, the bracket is engaged with the head 25 when the latter is outwardly spaced from the wall surface a distance corresponding to the distance of the nut as shown in Fig. 5, the screw being then tightened by engaging the open end wrench 21 with the body of the bracket and turning the same.

In Fig. 9 I have shown a toggle bolt 26 having a square nut 27 engaged upon its threaded shaft, and which is adapted for cooperation with the bracket of the invention by engaging the bracket with the square nut 27 and thereupon turning it to tighten the toggle bolt.

In Fig. 10 I have shown a bolt 28 having a square head 29 and provided with an expansion shield 30, and which is adapted for cooperation with the bracket of the invention by engaging the same with the square head 29 and thereupon turning the bolt to expand the shield.

What is claimed is:

In combination, a wall-engaging fastener having a shank portion adapted to project from the wall with its axis normal thereto, an enlarged fastening part carried by said shank having opposite flat sides parallel to each other and in planes normal to said wall and a flat bearing surface opposite and parallel to said wall, said part adapted upon turning about its axis in one or the other directions to move toward or away from said wall and adapted for axial turning fastening movement toward the wall, and a universal bracket for interlocking engagement with said fastener comprising a body member having a rectangular pocket receiving said fastening part to restrain axial turning of said fastening part within said pocket while permitting relative axial movement, said pocket being defined by a vertical base wall, a vertical front wall spaced forwardly from said base wall a distance substantially greater than the axial dimension of said fastening part, and vertical side walls having laterally opposite parallel inner flat surfaces extending from said base wall to said front wall each in a continuous vertical plane and being spaced apart laterally a distance to receive said fastening part between them in non-turning relation with the opposite flat sides of said fastening part substantially in engaged parallel relation with said inner flat surfaces, said base wall having a vertical outer wall engaging surface, a vertical inner flat surface for engagement by the bearing side of said fastening part and a vertical slot open at its lower end and receiving said shank portion of said fastener, the sides of said slot being in parallel spaced relation to said inner flat surfaces of said side walls, said pocket being open at its lower end to receive said fastening part with the opposite flat sides of said fastening part constrained between said side walls of said pocket whereby turning movement of said body portion turns said fastening part, and retaining lug means within said pocket contiguous to said base wall and projecting outwardly therefrom and then downwardly and inwardly thereto, said lugs being spaced laterally from said front wall a distance at least equal to the axial dimension of said fastening part to provide a space between said front wall and said lug means permitting vertical passage of said fastening part into and out of said pocket when said fastening part is contiguous to said front wall, and said lug means being disposed in the path of vertical passage of said fastening part out of said bracket when said fastening part is axially moved between said inner flat surfaces of said side walls into contiguous relation to said base wall.

References Cited in the file of this patent
UNITED STATES PATENTS

| | | |
|---|---|---|
| 585,475 | Huber | June 29, 1897 |
| 676,619 | Faethe | June 18, 1901 |
| 1,588,566 | Wismer | June 15, 1926 |
| 1,671,338 | Banks | May 29, 1928 |
| 2,244,427 | Miller | June 3, 1941 |